UNITED STATES PATENT OFFICE.

HARRY W. MORSE, OF TRONA, CALIFORNIA, ASSIGNOR TO AMERICAN TRONA CORPORATION, OF TRONA, CALIFORNIA, A CORPORATION OF DELAWARE.

PROCESS FOR SEPARATION OF CONSTITUENTS OF BRINES.

1,343,400.  Specification of Letters Patent.  Patented June 15, 1920.

No Drawing.  Application filed November 7, 1918. Serial No. 261,565.

*To all whom it may concern:*

Be it known that I, HARRY W. MORSE, a citizen of the United States, residing at Trona, in the county of San Bernardino, State of California, have invented a new and useful Process for Separation of Constituents of Brines, of which the following is a specification.

This invention relates to the production and separation of various salts from brines and is especially applicable to the brines found in Searles Lake, California, said brines containing sodium chlorid, sodium sulfate, sodium carbonate, potassium chlorid and borax.

The special object of the invention is to recover and separate the potassium chlorid and borax from the other salts present.

A further object of the invention is to effect such recovery and separation with a minimum of expense of fuel and labor. With this end in view, my process provides for evaporation of the raw brine at low temperature, preferably by solar evaporation and, further, by providing for carrying such evaporation only so far as is necessary to produce the conditions required for separation of the potassium chlorid and borax.

My invention consists essentially in the following steps:

First, solar evaporation until the ratio of salts to mother liquor is such that the mother liquor when heated to 90–100° C. with the salts, will dissolve the potassium chlorid and borax contained in the salts without redissolving any considerable portion of the other salts present in the solids precipitated in said evaporation.

Second, separation of residual salts from hot concentrated bleaching solution.

Third, eventual washing of the salts, or filtration.

Fourth, recovery of potassium chlorid and borax by cooling the concentrated leaching solution.

The composition of the brine to be treated is about as follows:

| | |
|---|---|
| Sodium chlorid | 16.3% |
| Sodium carbonate | 4.7 |
| Sodium sulfate | 7.0 |
| Potassium chlorid | 4.7 |
| Sodium biborate | 1.5 |
| Total solids | 34.3% |

In carrying out my process the raw brine is evaporated by exposure to solar evaporation until the salts and mother liquor are about 1 to 1 by weight and preferably not more than 1 part of salt to .8 part of water or mother liquor. This results in precipitation or crystallization of some of the potassium chlorid and borax as well as of sodium chlorid and other salts, and the mixture of mother liquor and salts is in such condition that it can be handled by pumps and forced to suitable apparatus for further treatment. The original evaporation may be carried out in open ponds or pans and the mixture of salts is then passed to suitable heating tanks wherein it is heated by any suitable heating means, to about 90–100° C. The mother liquor at this relatively higher temperature is still saturated as regards sodium chlorid but is no longer saturated as regards potassium chlorid and borax. The potassium chlorid and borax are dissolved, without any solution of the sodium chlorid, or at least without dissolving more than a small amount thereof, on account of the slight change in solubility of this salt with change of temperature. At the higher temperatures stated, the sodium sulfate and sodium carbonate redissolve to only a slight extent in the mother liquor.

The following may be taken as approximately representing the composition of the hot concentrated liquor produced by heating the mixture of salts and mother liquor:

| | |
|---|---|
| Potassium chlorid | 16.% |
| Borax | 7. |
| Sodium chlorid | 10. |
| Sodium carbonate | 8. |
| Sodium sulfate | 2. |
| Total solids | 43.% |

The leached salts are separated from the hot liquor, which is then cooled. Potassium chlorid and borax are crystallized out during the cooling. The mother liquor from the crystallizing operation may be treated to recover the residual valuable salts, if desired. The potassium chlorid and borax separated in this manner may be treated further for separation of the potassium chlorid and the borax from each other or the mixture may be disposed of as a commercial article.

What I claim is—

1. The process of separating potassium chlorid and borax from brines containing the same together with sodium chlorid and other salts, which consists in evaporating such brines to a density such that the remanent liquor is in such ratio to the precipitated salts that substantially all the potassium chlorid and borax of the salts will dissolve in the liquor when salts and liquor are heated together to 90 to 100° C. without redissolving of any considerable portion of the other salts present; heating salts and liquor together to 90 to 100° C., separating the residual salts from the liquor and cooling the liquor to cause crystallization of potassium chlorid and borax;

2. The process of separating potassium chlorid and borax from brines which consists in evaporating such brines at relatively low temperature and then heating the brines, together with the salts crystallized therefrom, to a higher temperature, the said evaporation of the brine being carried to a point such that substantially all of the potassium chlorid and borax will be dissolved at such higher temperature, without redissolving of any considerable amount of the other salts present, then separating the residual crystallized material and then cooling the solution to separate potassium chlorid;

3. The process of recovering potassium chlorid and borax from saline brines which consists in evaporating the brine by solar heat until salts and mother liquor are approximately equal in weight, then heating the mixture of salts and liquor to approximately 100° C. whereby the potassium chlorid and borax are dissolved without dissolving more than a small amount of sodium chlorid, and then cooling to cause the separation of potassium chlorid and borax.

In testimony whereof I have hereunto subscribed my name this 24th day of October, 1918.

HARRY W. MORSE.